(12) United States Patent
Alshinnawi et al.

(10) Patent No.: US 9,684,463 B1
(45) Date of Patent: Jun. 20, 2017

(54) PREDICTIVE BLOCK ALLOCATION IN A FLASH DEVICE

(71) Applicant: LENOVO ENTERPRISE SOLUTIONS (SINGAPORE) PTE. LTD., Singapore (SG)

(72) Inventors: Shareef F. Alshinnawi, Apex, NC (US); Gary D. Cudak, Wake Forest, NC (US); Joseph F. Herman, Jr., Raleigh, NC (US); William M. Megarity, Raleigh, NC (US); J. Mark Weber, Wake Forest, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/995,309

(22) Filed: Jan. 14, 2016

(51) Int. Cl.
*G06F 12/00* (2006.01)
*G06F 3/06* (2006.01)
*G06F 12/02* (2006.01)

(52) U.S. Cl.
CPC .......... *G06F 3/0616* (2013.01); *G06F 3/064* (2013.01); *G06F 3/0631* (2013.01); *G06F 3/0679* (2013.01); *G06F 12/0246* (2013.01)

(58) Field of Classification Search
None
See application file for complete search history.

(56) References Cited

U.S. PATENT DOCUMENTS

2013/0080689 A1* 3/2013 Jo .................. G06F 12/0246
                                                          711/103
2016/0196076 A1* 7/2016 Oh .................. G06F 12/0246
                                                          711/103

OTHER PUBLICATIONS

Wikipedia, "Write Amplification", Wikipedia.org (online), accessed Nov. 16, 2015, 12 pages, URL: https://en.wikipedia.org/wiki/Write_amplification.
Hu et al., "Write Amplification Analysis in Flash-Based Solid State Drives", Proceedings of SYSTOR 2009: The Israeli Experimental Systems Conference (SYSTOR'09), May 2009, Article No. 10, 10 pages, ACM New York, NY.
Unisex, "Upcoming Conferences", unisex.org (online), accessed Nov. 16, 2015, 3 pages, URL: https://www.usenix.org/conferences.

* cited by examiner

*Primary Examiner* — Brian Peugh
(74) *Attorney, Agent, or Firm* — Brandon C. Kennedy; Douglas W. Robinson; Kennedy Lenart Spraggins LLP

(57) ABSTRACT

Predictive block allocation in a flash device, where the flash device includes a plurality of blocks may include: receiving a request to store data to the flash device; determining, in dependence upon one or more characteristics of the data, a usage prediction value for the data; determining, in dependence upon the usage prediction value for the data and upon wear levels for the plurality of blocks, a block from among the plurality of blocks; and; and storing the data in the block of the plurality of blocks.

20 Claims, 9 Drawing Sheets

PREDICTIVE BLOCK ALLOCATION IN A FLASH DEVICE

BACKGROUND

Field of the Invention

The field of the invention is data processing, or, more specifically, methods, apparatus, and computer program products for predictive block allocation in a flash device.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of advancement includes data storage devices, including flash storage devices. While flash storage devices generally allow for fast access time, blocks within a flash storage device have a limited life cycle. Consequently, methods have been developed for wear leveling so that blocks may generally have similar life cycles. However, traditional methods for wear leveling occur after data has been written to a flash device.

SUMMARY OF THE INVENTION

Disclosed are embodiments for predictive block allocation in a flash device, where the flash device may include a plurality of blocks. Such predictive block allocation includes: receiving a request to store data to the flash device; determining, in dependence upon one or more characteristics of the data, a usage prediction value for the data; determining, in dependence upon the usage prediction value for the data and upon wear levels for the plurality of blocks, a block from among the plurality of blocks; and; and storing the data in the block of the plurality of blocks.

The foregoing and other features, aspects, and details are described in the Detailed Description, and as illustrated in the accompanying drawings, where like reference numbers generally represent like parts of the disclosed embodiments.

DETAILED DESCRIPTION

Embodiments of methods, apparatus, and computer program products for predictive block allocation in a flash device are described with reference to the accompanying drawings, beginning with FIG. 1.

Figure 1:
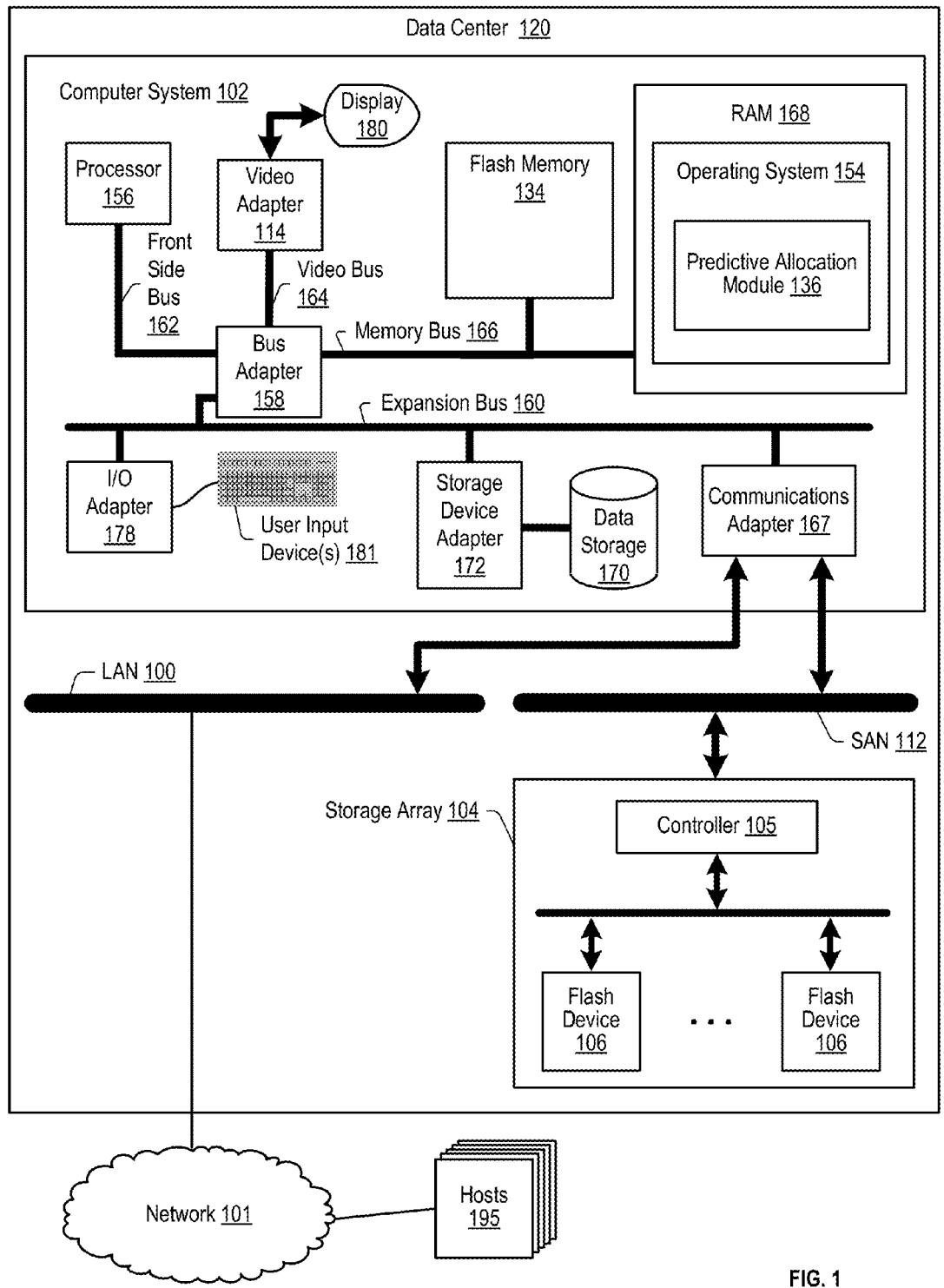
FIG. 1 illustrates a computer system configured for predictive block allocation in a flash device according to an embodiment.

FIG. 1 includes a computer system (102) that may be configured for predictive block allocation in a flash device, where the flash device may be within the computer system (102), such as flash memory (134), or where the flash device may be within a storage array (104) accessible over a computer network. In different embodiments, steps for implementing predictive block allocation in a flash device may be performed entirely within the computer system (102), performed entirely within the storage array (104), or performed using both the computer system (102) and the storage array (104) for implementing different steps for predictive block allocation in a flash device.

In an embodiment, the computer system (102), using a predictive allocation module (136), may receive a request to store data to a flash device, and for the request, the computer system (102) determines, in dependence upon one or more characteristics of the data, a usage prediction value for the data. A usage prediction value as the term is used in this specification is an estimate for how frequently the data is expected to be accessed after writing the data to a flash device.

Further, the computer system (102) may reference current wear levels for blocks of the flash device, and in dependence upon the wear levels and on the usage predication value for the data, the computer system (102) may determine a block from among the plurality of blocks of the flash device, and store the data in the block of the plurality of blocks—such that future data migrations for the purposes of wear leveling are reduced.

For example, if data in a write command is determined to have a high usage predication value, then the computer system (102) may determine that a block with a low wear level is more appropriate than a block with a high wear level because frequent access of a block with a low wear level would result in more balanced wear leveling than if a block with a high wear level were frequently accessed.

Predictive block allocation in a flash device may prevent, or reduce, data migrations for wear leveling by predicting an estimated usage level for data to be written, and selecting a block for writing based on the estimated usage level for the data. For example, the usage prediction value for data may be used to select a block within a flash device such that wear on all the blocks in the flash device proceeds in a balanced manner without, or with minimized, data migrations after the data is written.

Figure 2:
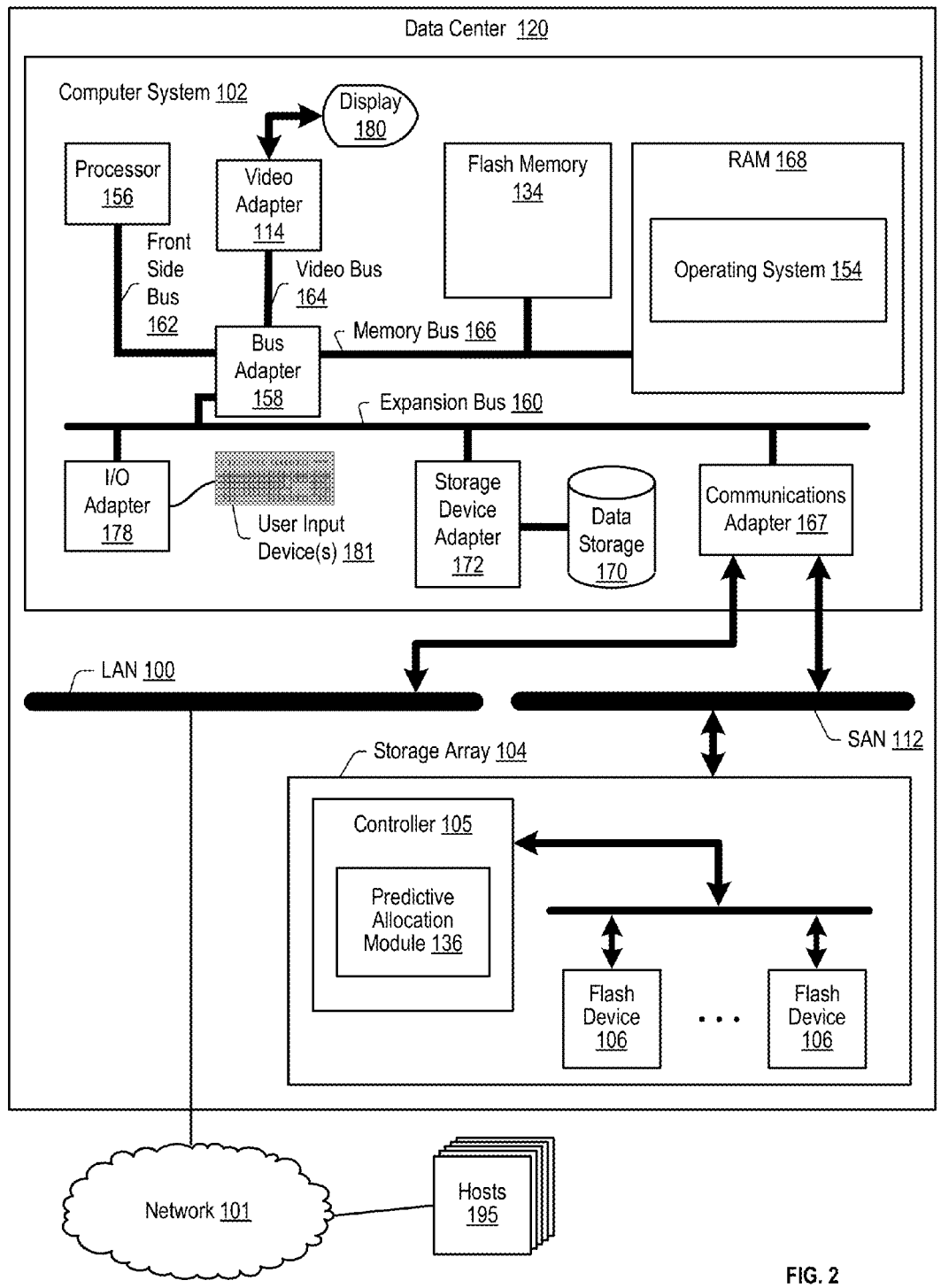
FIG. 2 illustrates a storage array configured for predictive block allocation in a flash device according to an embodiment.

Turning to FIG. 2, in an embodiment, the computer system (102) may receive requests, and in response, send commands to the storage array (104) over storage area network (SAN) (112), where the storage array (104), using a predictive allocation module (136), implements the predictive block allocation in a flash device (106).

The controller (105) of the storage array (104) may receive a write command, and the controller (105) may determine a usage predication value as an estimate for how frequently the data is expected to be accessed after writing the data. Further, the controller (105) may reference current wear levels for blocks of multiple flash devices (106), and in dependence upon the wear levels and on the usage predication value for the data, the controller (105) may determine a particular flash device, and a particular block from among the blocks of the particular flash device such that future data migrations for the purposes of wear leveling are reduced. For example, if data in a write command is determined to have a high usage predication value, then the controller (105) may determine that a block with a low wear level is more appropriate than a block with a high wear level because frequent access of a block with a low wear level would result in more balanced wear leveling than if a block with a high wear level were frequently accessed.

In an embodiment, the computer system (102), using a predictive allocation module (136), may operate in tandem with the storage array (104) to implement predictive block allocation in a flash device, where the storage array (104) also implements a predictive allocation module (136).

The computer system (102) may: receive, from a host device (195) over a network (101), a request to store data to a flash device; determine, in dependence upon one or more characteristics of the data, a usage predication value for the data; and send, to the storage array (104), a write command indicating the data and the usage prediction value.

The storage array (104) may: receive, from the computer system (102), the write command to store data to a flash device, where the write command indicates the data and also indicates the usage prediction value; determine, in dependence upon the usage predication value and in dependence upon wear levels for a plurality of blocks within the flash device or flash devices, a particular block or blocks for storing the data; and storing the data in the particular block or blocks of the flash device or flash devices.

The computer system (102) and storage array (104) of FIGS. 1 and 2 are for purposes of illustration, not for limitation. While computer system (102) and storage array (104) are depicted within a data center (120), the computer system (102) and storage array (104) may be implemented in other computing environments.

The data center (120) may include additional servers, routers, other devices, and peer-to-peer architectures, not shown in the figures, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments may be implemented on a variety of hardware platforms in addition to those illustrated.

Predictive block allocation in a flash device is generally implemented with computers, that is, with automated computing machinery. In the computer systems of FIGS. 1 and 2, for example, the computer system (102) and the storage array (104) may be implemented using one or more computer hardware processors. For further explanation, therefore, FIGS. 1 and 2 illustrate block diagrams of automated computing machinery comprising embodiments of a computer system (102) and storage array (104) configured for predictive block allocation in a flash device.

The computer system (102) includes at least one computer processor (156) or "CPU" as well as random access memory (168) or "RAM," which is connected through a high speed memory bus (166) and bus adapter (158) to processor (156) and to other components of the computer system (104).

Stored in RAM (168), and/or controller (105), is a predictive allocation module (136), a module of computer program instructions improved for predictive block allocation in a flash device according to various embodiments. The predictive allocation module (136) may, when executed, cause the computer system (102) or the storage array (104) to carry out the steps of: receiving a request to store data to a storage device, for example, a flash device, where the flash device includes a plurality of blocks; determining, in dependence upon one or more characteristics of the data, a usage prediction value for the data; determining, in dependence upon the usage prediction value and in dependence upon wear levels for the plurality of blocks, a block of the plurality of blocks for storing the data; and storing the data in the block of the plurality of blocks.

Also stored in RAM (168) is an operating system (154). Operating systems useful in computers configured for predictive block allocation in a flash device according to various embodiments include UNIX™, Linux™, Microsoft XP™, AIX™, IBM's i5/OS™, and others as will occur to those of skill in the art. The operating system (154) and predictive allocation module (136) are shown in RAM (168) or controller (105), but many components of such software may typically be stored in non-volatile memory such as, for example, on a data storage (170) device, or on data storage within the storage array (104).

The computer system (102) may also include a storage device adapter (172) coupled through expansion bus (160) and bus adapter (158) to processor (156) and other components of the computer system (104). Storage device adapter (172) connects non-volatile data storage to the computer system (104) in the form of data storage (170). Storage device adapters useful in computers configured for predictive block allocation in a flash device according to various embodiments include Integrated Drive Electronics ("IDE") adapters, Small Computer System Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computer system (102) may also include one or more input/output ("I/O") adapters (178). I/O adapters implement user-oriented input/output through, for example, software drivers and computer hardware for controlling output to display devices such as computer display screens, as well as user input from user input devices (181) such as keyboards and mice. The example computer system (102) may also include a video adapter (114), which may be an example of an I/O adapter specially designed for graphic output to a display device (180) such as a display screen or computer monitor. Video adapter (114) may be connected to processor (156) through a high speed video bus (164), bus adapter (158), and the front side bus (162), which may also be a high speed bus.

The computer system (102) may also include a communications adapter (167) for data communications with other computers or devices and for data communications with a data communications network, such as data communications with storage array (104) over storage area network (112), or such as data communications with hosts (195) over local area network (100). Such data communications may be carried out serially through RS-232 connections, through external buses such as a Universal Serial Bus ("USB"), through data communications networks such as IP data communications networks, and in other ways as will occur to those of skill in the art. Communications adapters may implement the hardware level of data communications through which one computer sends data communications to another computer, directly or through a data communications network. Examples of communications adapters useful in computers configured for predictive block allocation in a flash device according to various embodiments include modems for wired dial-up communications, Ethernet (IEEE 802.3) adapters for wired data communications, and 802.11 adapters for wireless data communications.

In an embodiment, a flash device (106) may include several pages, where each page includes several blocks of non-volatile memory. In an embodiment, a block size may be implemented to be any number of bytes, and a flash device may include any number of pages. For example, the flash device (106) may include M pages, where each page may include N blocks. In an embodiment, flash memory (134) of the computer system (102) may also be organized similar to the memory organization of flash device (106).

In an embodiment, controller (105) of the storage array (104) may have access to wear levels for each of the blocks of the various flash devices, and also have access to an estimated maximum wear level. In an embodiment, a map of the blocks may be maintained to indicate wear levels, where a given wear level for a block may indicate how many write cycles remain for the given block before the given block is expected to become unreliable.

Figure 3:
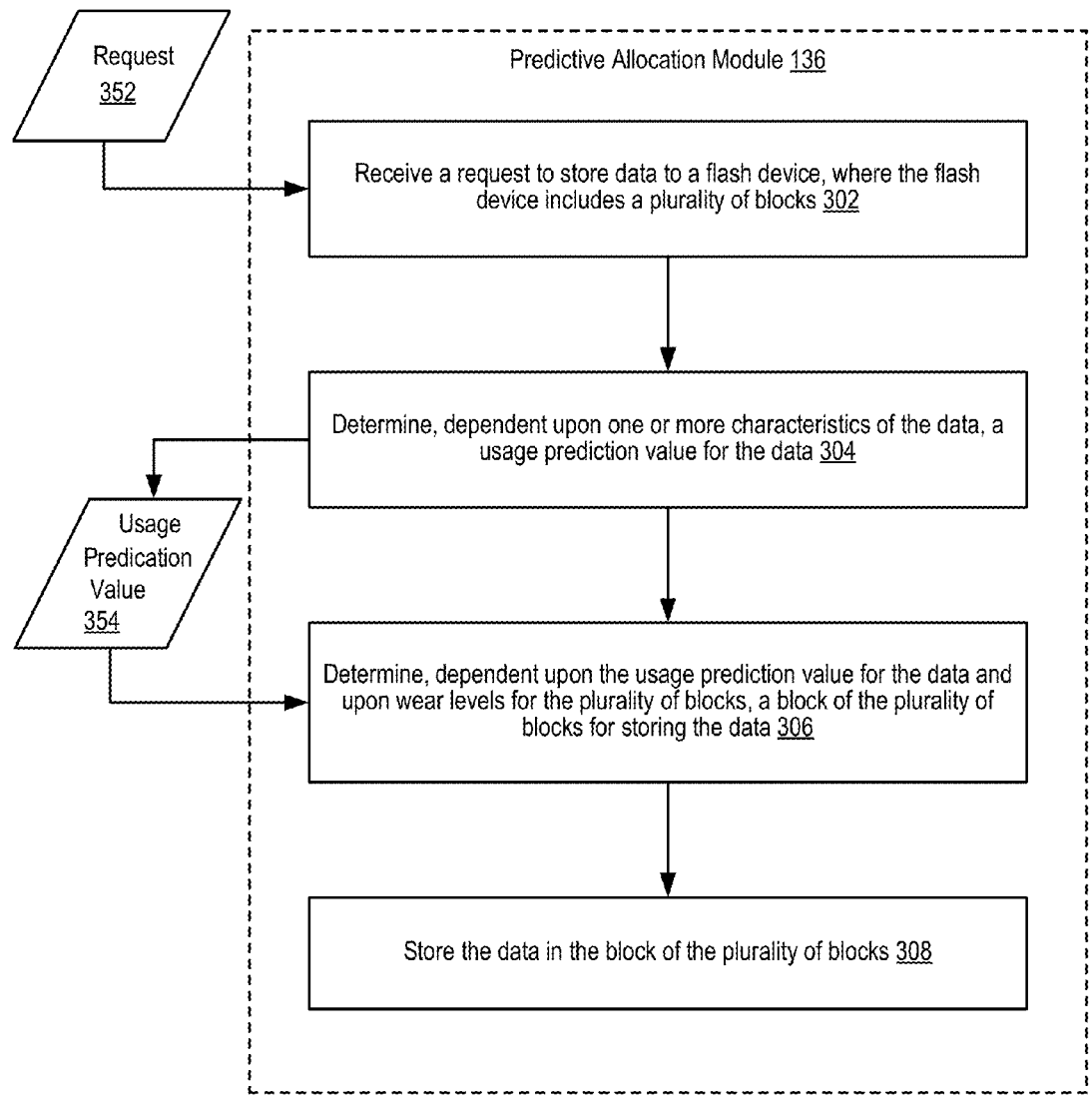
FIG. 3 depicts a flow chart illustrating an embodiment of a method for predictive block allocation in a flash device according to some embodiments.

Turning to FIG. 3, depicted is a flow chart illustrating an embodiment of a method for predictive block allocation in a flash device. The method of FIG. 3 may be carried out by a predictive allocation module (136), where the predictive allocation module may be implemented in either the computer system (102) or implemented within the storage array (104).

The method of FIG. 3 includes: receiving (302) a request (352) to store data to a storage device, for example, a flash device, where the flash device includes a plurality of blocks; determining (304), in dependence upon one or more characteristics of the data, a usage prediction value for the data; determining (306), in dependence upon the usage prediction value (354) and in dependence upon wear levels for the plurality of blocks, a block of the plurality of blocks for storing the data; and storing the data in the block of the plurality of blocks.

On a computer system (102), receiving (302) the request (352) may be carried out by the operating system (154) receiving a write command, for example, a write command from another application executing on the computer system (102), or from a host device (195) over a network (101). The operating system (154) may then provide the write command to the predictive allocation module (136), where the predictive allocation module (136) may write to the flash memory (134) within the computer system (102), or write to the storage array (104).

On a storage array (104), receiving (302) the request (352) may be carried out by the controller (105) receiving a write command over SAN (112) from computer system (102). Controller (105) may then provide the write command to the predictive allocation module (136), where the predictive allocation module (136) may write to one or more of the flash devices (106) within the storage array (104).

Determining (304) the usage prediction value may be carried out by the predictive allocation module (136) accessing, or determining one or more of the characteristics for the data specified in the request to store data. For example, the predictive allocation module (136) may determine a file type for the data, such as a spreadsheet, a video file, an audio file, an image file, or some other type of file. Given the file type for the data, the predictive allocation module (136) may determine a relative frequency of access based on usage patterns or metrics for other, previously stored, files of the same or similar type. For example, the predictive allocation module (136) may track numbers of accesses for previously written file types over the course of the lifetime of a file. In this way, the predictive allocation module (136) may determine a usage prediction value that corresponds with previous access patterns for the same, or similar, file type.

In an embodiment, the predictive allocation module (136) may also determine a usage prediction value using additional information about characteristics of the data to be stored. For example, the predictive allocation module (136) may reference a user profile that includes characteristics about a current user, and use the user profile data to adjust a usage prediction value. In this example, the predictive allocation module (136) may increase the usage prediction value if the file type is a video file, or video game, and the user profile indicates the user is a teenage boy. Similarly, for the same user profile for the teenage boy, the predictive allocation module (136) may decrease the usage prediction value if the file type is a spreadsheet. In this way, the predictive allocation module (136) may adjust the usage prediction value based on characteristics of the data depending on the user associated with the request to store data.

In an embodiment, the predictive allocation module (136) may also determine a usage prediction value using additional information about characteristics of the data to be stored, where the characteristics of the data are obtained from third party sources. For example, the predictive allocation module (136) may communicate with a third party system, such as an online website or remote database, and request information regarding the data to be stored. In this example, the predictive allocation module (136) may increase the usage prediction value if the third party system provides characteristic information describing the data as trending, or popular, and decrease the usage prediction value otherwise.

In one case, the prediction allocation module (136) may determine that the data includes a movie, in response the prediction allocation module (136) may query one or more third party websites with information about movies. For example, if the movie being stored is within a top 10, top 20, or top 100 movies, then the predictive allocation module (136) may increase the usage prediction value for the data that includes the movie. In some cases, the predictive allocation module (136) may further specify the query to one or more third party websites or systems according to the user. For example, if the user profile indicates a 50 year-old woman, the predictive allocation module (136) may request the top X movies for middle aged women, or 50 year-old women, and if the movie being stored is among the returned list, then the predictive allocation module (136) may increase the usage prediction value.

Determining (306) the block to write to from among the plurality of blocks of the flash device may be carried out by the predictive allocation module (136) determining which of the blocks—if written to with the data, and if the data is accessed according to the usage predication value—would avoid, or reduce, data migrations for wear leveling for future memory accesses.

In an embodiment, the predictive allocation module (136) may obtain wear level data for the blocks in the flash device, and categorize the wear levels according to three categories: hot, medium, or cold. Similarly, the predictive allocation module (136) may categorize the usage prediction value as either hot, medium or cold. Given these categorizations, the predictive allocation module (136) may then determine the block from among a plurality of blocks based on the block being categorized as cold and the usage prediction value for the data being hot. Similarly, the prediction allocation module (136) may determine the block from among a plurality of blocks based on the block being categorized as hot and the usage prediction value for the data being cold, and may determine the block from among a plurality of blocks based on the block being categorized as medium and the usage prediction value for the data being medium. In other words, data that is expected to be frequently accessed, hot data, is stored on a block that is currently not being frequently accessed, a cold block, and similarly for cold data and hot blocks, and for medium data and medium blocks. In this way, all of the blocks of the flash device would reach a similar temperature, and consequently, wear down similarly and evenly.

In an embodiment, the predictive allocation module (136) may obtain wear level data for the blocks in the flash device, and determine which of the blocks, if written to with the data, where the data is expected to be accessed an amount of times corresponding with the usage prediction value, would result in the block being used near to, but not exceeding a maximum wear level for the block. In other words, the selected block may be written to, over the course of the life cycle of all the blocks in the flash device, without the block being written more than the maximum wear level, and without the written data being moved from the block. In this way, the blocks of the flash device, regardless of temporary temperature fluctuations in the blocks of the device, and without any migrations, would wear down evenly over the course of the life cycle of the flash device.

Storing (308) the data in the block of the plurality of blocks may be carried out by the predictive allocation module (136) issuing commands to the flash memory to carry out the steps of writing data to the specified block of flash memory. In this way, the data specified in the initial request (352) to store data is stored in flash memory.

In an embodiment, the method of FIG. 3 may be carried jointly by a computer system (102) and a storage array (104). For example, the computer system (102) may perform: receiving a request to store data; determining, in dependence upon one or more characteristics of the data, a usage prediction value for the data; and sending, to the storage array (104), a write command indicating the data and indicating the usage prediction value, where the storage array (104) includes one or more flash devices, and where each flash device includes a plurality of blocks.

Further in this embodiment, the storage array (104) may perform: receiving the write command to store the data to a flash device within the storage array (104), where the write command indicates the usage prediction value; determining, in dependence upon the usage prediction value and in dependence upon wear levels for the plurality of blocks, a block from among the plurality of blocks for storing the data; and storing the data in the determined block from among the plurality of blocks.

Receiving the request to store data and determining the usage prediction value may be carried out similar to the description above with regard to FIG. 3.

Sending the write command may be carried out by the computer system (102) providing the write command to a device driver for the storage array (104), where the device driver may transmit the write command to the storage array (104). For example, the device driver may be a device driver for the communications adapter (167), and the device driver may transmit a write command to the storage array (104) over the SAN (112) using one or more of the data communication protocols described above with regard to communications adapter (167).

Receiving the write command to store the data to a flash device among the flash devices of the storage array (104) may be carried out by the controller (105) receiving a data communication over the SAN (112) using one or more communications protocols. For example, storage array (104) may also include (not depicted) a communications adapter similar to communications adapter (167) over which the storage array (104) may receive and transmit data communications.

Determining the block from among the plurality of blocks may be carried out by the predicative allocation module (136) implemented within the controller (105) determining which of the blocks—if written to with the data, and if the data is accessed according to the usage predication value—would avoid, or reduce, data migrations for wear leveling for future memory accesses. In an embodiment, determining the block may be carried out similarly to the description above with regard to the determining (306) the block for writing the data.

Storing the data in the block of the plurality of blocks may be carried out by the controller (105) issuing commands to a flash device within the storage array (104) to carry out the steps of writing data to the specified block of flash memory. In this way, the data specified in the write command to store data is stored in flash memory, which in turn satisfies the initial request to store the data.

Figure 4:
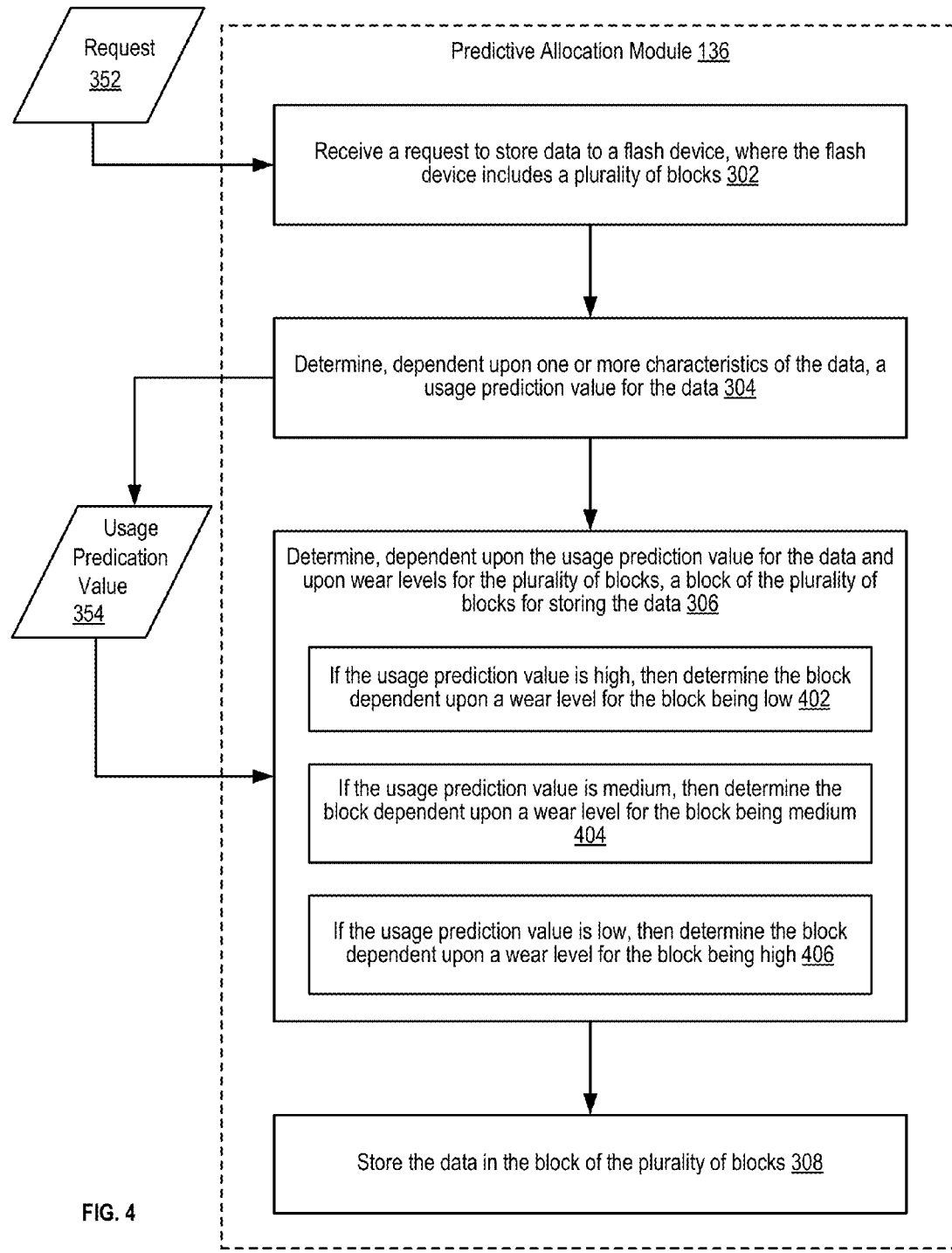
FIG. 4 depicts a flow chart illustrating another embodiment of a method for predictive block allocation in a flash device.

Turning to FIG. 4, the method of FIG. 4 is similar to the method of FIG. 3 in that the method of FIG. 4 includes: receiving (302) a request (352) to store data to a storage device, for example, a flash device, where the flash device includes a plurality of blocks; determining (304), in dependence upon one or more characteristics of the data, a usage prediction value for the data; determining (306), in dependence upon the usage prediction value (354) and in dependence upon wear levels for the plurality of blocks, a block of the plurality of blocks for storing the data; and storing the data in the block of the plurality of blocks.

However, the method of FIG. 4 differs from the method of FIG. 3 in that the method of FIG. 4, in determining (306) the block includes the following determinations: if (402) the usage prediction value is high, then determining the block in dependence upon a wear level for the block being low; if (404) the usage prediction value is medium, then determining the block in dependence upon a wear level for the block being medium; and if (406) the usage prediction value is low, then determining the block in dependence upon a wear level for the block being high.

As described above with regard to FIG. 3, the predictive allocation module (136) may categorize the usage prediction value into a high, medium, or low predicated number of accesses, and similarly categorize the block wear levels as high, medium, or low. In an embodiment, a user may specify threshold values for specifying numbers of accesses considered to be high, medium, and low, or these threshold values may be default values.

Figure 5:
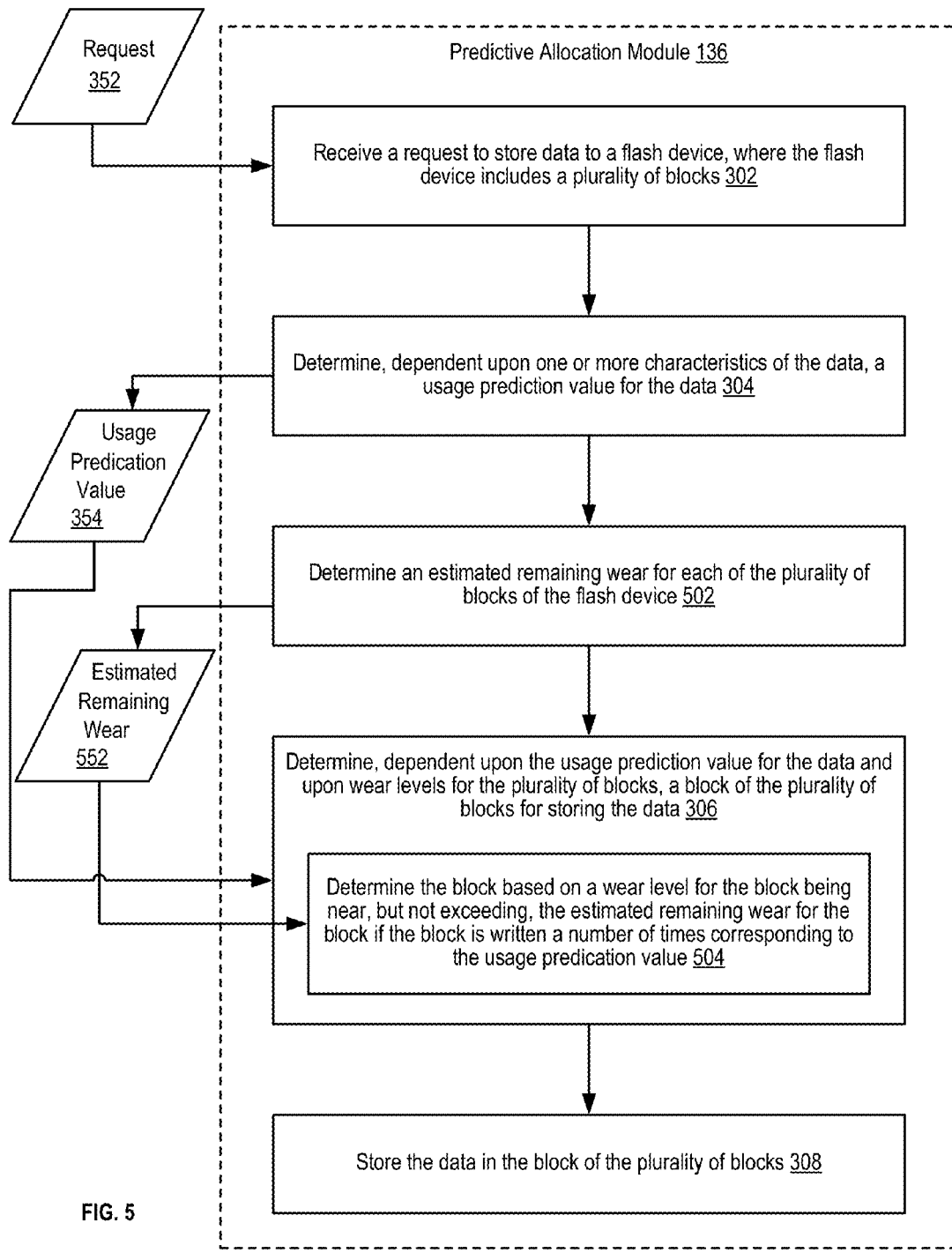
FIG. 5 depicts a flow chart illustrating another embodiment of a method for predictive block allocation in a flash device.

Turning to FIG. 5, the method of FIG. 5 is similar to the method of FIG. 3 in that the method of FIG. 5 includes: receiving (302) a request (352) to store data to a storage device, for example, a flash device, where the flash device includes a plurality of blocks; determining (304), in dependence upon one or more characteristics of the data, a usage prediction value for the data; determining (306), in dependence upon the usage prediction value (354) and in dependence upon wear levels for the plurality of blocks, a block of the plurality of blocks for storing the data; and storing the data in the block of the plurality of blocks.

However, the method of FIG. 5 differs from the method of FIG. 3 in that the method of FIG. 5 includes: determining (502) an estimated remaining wear (552) for each of the plurality of blocks of the flash device; and where determining (306) the block includes determining (504) the block based on a wear level for the block being near, but not exceeding, the estimated remaining wear for the block if the block is written a number of times corresponding to the usage prediction value (354).

Determining (502) an estimated wear (552) for the plurality of blocks of the flash device, or flash devices, may be carried out by accessing, or obtaining, wear level data that is maintained for each block of the flash device or flash devices. In an embodiment, wear level data may be stored in a data structure to track a number of writes or accesses for each block, and to store information on an expected number of writes for each of the blocks.

Determining (504) the block may be carried out by the predictive allocation module (136) determining an amount of wear remaining for each potential block to be written, and determining which of those potential blocks—if written an amount of times corresponding to the usage predication value—would result in the potential block being written an amount that is near, but does not exceed, the estimated remaining wear for that potential block. In this way, if each potential block to be written is written with data that consumes the remainder of a respective expected remaining wear, then each block would wear out, or live the rest of an expected life cycle, without any data migrations for balancing wear levels among the blocks.

Figure 6:
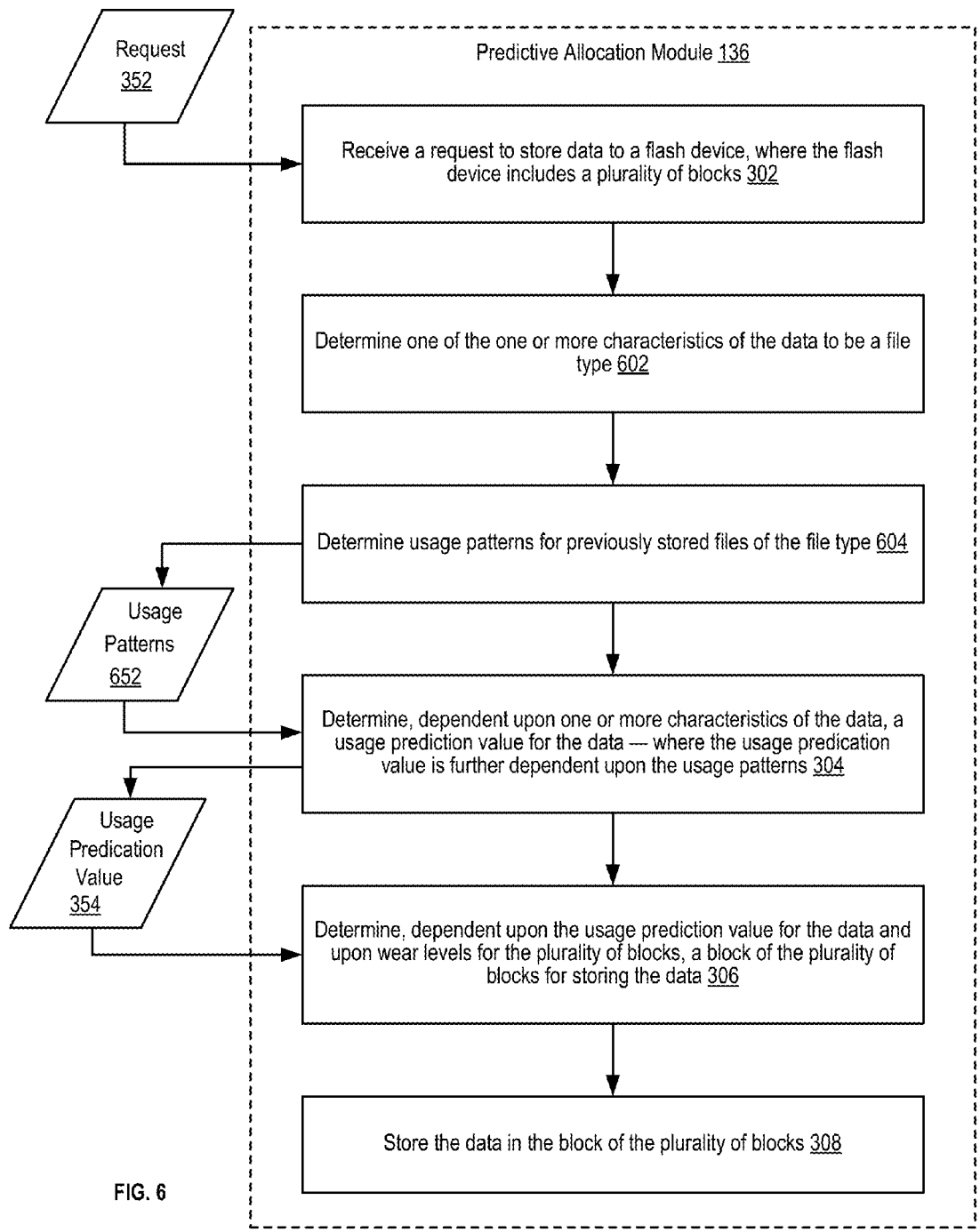
FIG. 6 depicts a flow chart illustrating another embodiment of a method for predictive block allocation in a flash device.

Turning to FIG. 6, the method of FIG. 6 is similar to the method of FIG. 3 in that the method of FIG. 6 includes: receiving (302) a request (352) to store data to a storage device, for example, a flash device, where the flash device includes a plurality of blocks; determining (304), in dependence upon one or more characteristics of the data, a usage prediction value for the data; determining (306), in dependence upon the usage prediction value (354) and in dependence upon wear levels for the plurality of blocks, a block of the plurality of blocks for storing the data; and storing the data in the block of the plurality of blocks.

However, the method of FIG. 6 differs from the method of FIG. 3 in that the method of FIG. 6 includes determining (602) one of the one or more characteristics of the data to be a file type; and determining (604) usage patterns (652) for previously stored files of the file type—where the determining (304) the usage prediction value is further dependent on the usage patterns (652).

Determining (602) that a characteristics of a file within the data to be written to be of a file type may be carried out by the predictive allocation module (136) analyzing the data to identify a file or files, and analyzing metadata for the file or files to determine a file type or file types.

Determining (604) usage patterns for previously stored files of the file type may be carried out by the predictive allocation module (136), or another process within the system implementing the predictive allocation module (136), tracking and storing metrics for accesses for different file types. For example, the predictive allocation module (136) may maintain a data structure to record each access type for a given file type for each memory operation—where the files may or may not be currently stored within the memory. In an embodiment, the data structure recording access patterns may be updated in response to memory operations to different types of memory, not only the flash memory.

Figure 7:
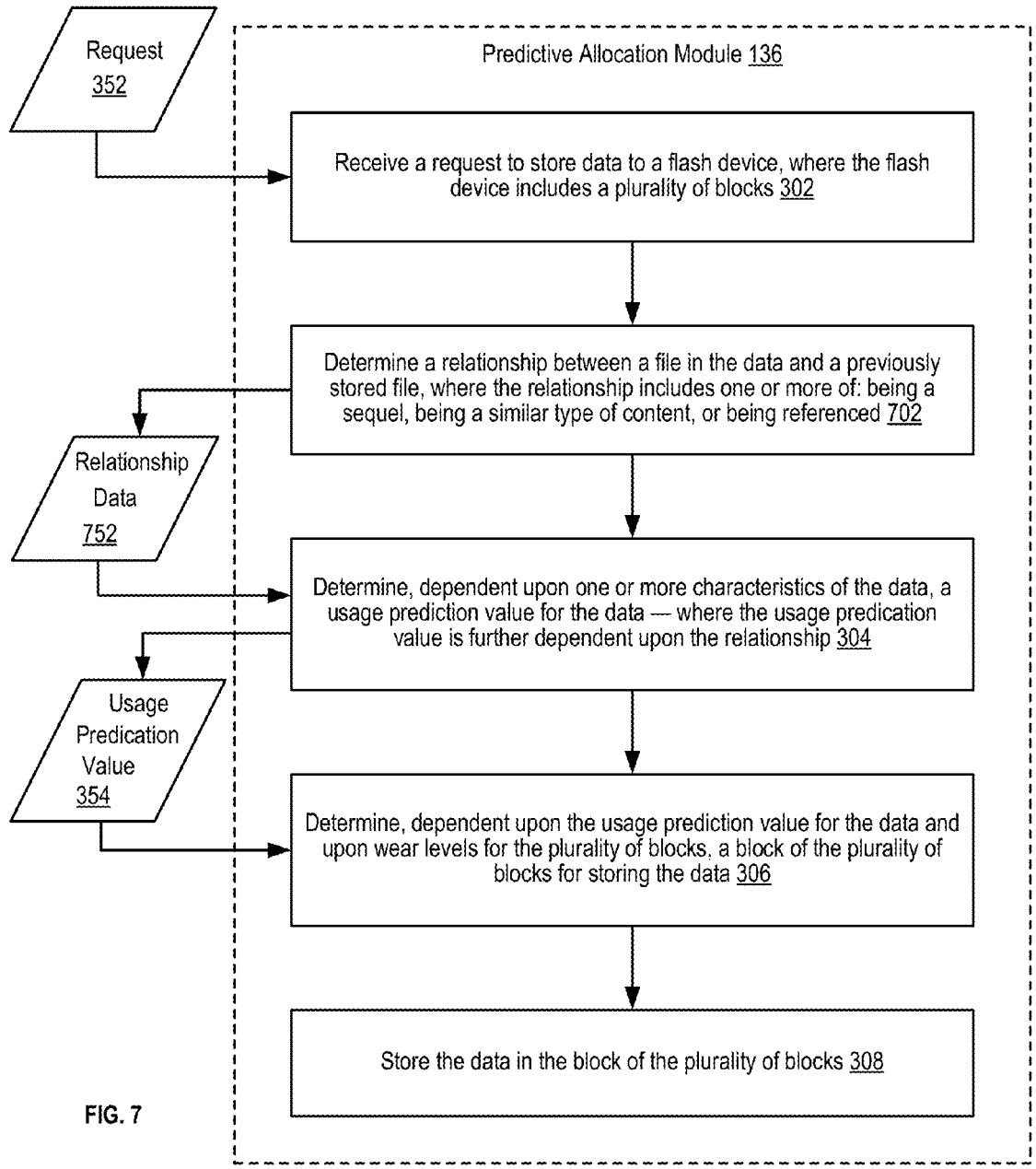
FIG. 7 depicts a flow chart illustrating another embodiment of a method for predictive block allocation in a flash device.

Turning now to FIG. 7, the method of FIG. 7 is similar to the method of FIG. 3 in that the method of FIG. 7 includes: receiving (302) a request (352) to store data to a storage device, for example, a flash device, where the flash device includes a plurality of blocks; determining (304), in dependence upon one or more characteristics of the data, a usage prediction value for the data; determining (306), in dependence upon the usage prediction value (354) and in dependence upon wear levels for the plurality of blocks, a block of the plurality of blocks for storing the data; and storing the data in the block of the plurality of blocks.

However, the method of FIG. 7 differs from the method of FIG. 3 in that the method of FIG. 7 includes determining (702) a relationship between a file in the data and a previously stored file, where the relationship data (752) may include one or more of: being a sequel, being a similar type of content, or being referenced—and where the determining (304) of the usage prediction value is further dependent on the determined relationship.

Determining (702) the relationship and relationship data (752) may be carried out by the predictive allocation module (136) analyzing the contents of the data to be written to identify a file as being particular content, such as a specific movie, a specific song, a specific image, or some other specific content. For example, the predictive allocation module (136) may analyze the data to identify a file, and analyze the metadata for the file to identify a file type and a file name, for example, a movie title, a song title, among others. The predictive allocation module (136) may then determine content that may be related to the identified content.

For example, the predictive allocation module (136) may determine a movie title, and determine one or more third party sources with information on movies, for example, an online movie website such as the Internet Movie Database™, and query the website for information about the movie title. In this way, the predictive allocation module (136) may obtain information on related content, such as movie sequels, prequels, or similar movies, such as movies recommended based on people liking the queried-for movie. Given the related content, the predictive allocation module (136) may access information on previously stored files to determine if a previously stored file matches one of the content of the determined related content.

In this way, the predictive allocation module (136) may adjust the usage prediction value in accordance with the access data for the previously stored, and related content. For example, if the data being stored includes a particular movie, and the predictive allocation module (136) determines related content, such as a prequel or a spinoff has been previously stored, then the usage prediction value may be increased to reflect the likelihood that movie being stored may be accessed more frequently.

In an embodiment, the usage prediction value may be adjusted to reflect access patterns for the related content. For example, if the related, and previously stored, content has been frequently accessed, then the usage prediction value may be adjusted higher, and if the related, and previously stored, content has been infrequently accessed, then the usage prediction value may be adjusted lower.

Further, a relationship between files may be based on one file referencing another file. For example, a spreadsheet file may include a field that references data from another file, or a web page file may include a link to another web page file.

Figure 8:
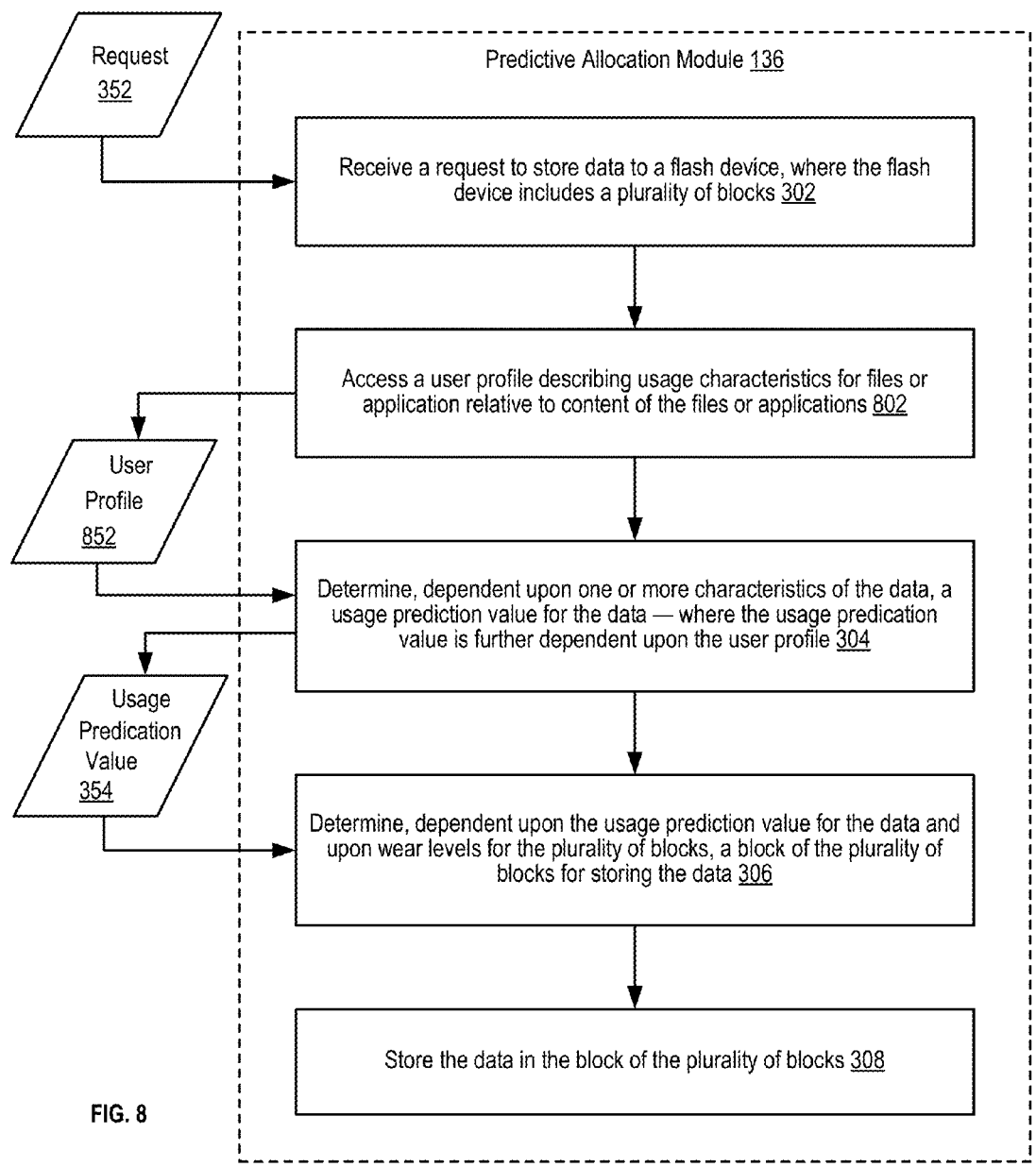
FIG. 8 depicts a flow chart illustrating another embodiment of a method for predictive block allocation in a flash device.

Turning to FIG. 8, the method of FIG. 8 is similar to the method of FIG. 3 in that the method of FIG. 8 includes: receiving (302) a request (352) to store data to a storage device, for example, a flash device, where the flash device includes a plurality of blocks; determining (304), in dependence upon one or more characteristics of the data, a usage prediction value for the data; determining (306), in dependence upon the usage prediction value (354) and in dependence upon wear levels for the plurality of blocks, a block of the plurality of blocks for storing the data; and storing the data in the block of the plurality of blocks.

However, the method of FIG. 8 differs from the method of FIG. 3 in that the method of FIG. 8 includes: accessing (802) a user profile (852) describing usage characteristics for files or applications relative to content of the files or applications. For example, an Excel™ spreadsheet application may access file A at a first usage rate, and access file B at a second usage rate. In this example, if file A includes one type of data, such as financial data, the usage rate for other files including financial data may be attributed to the first usage rate. Similarly, if file B includes another type of data, such as contact information, the usage rate for other files including contact information may be attributed to the second usage rate.

In an embodiment, the user profile may include one or more of: favorite genres of movies, favorite genres of music, user age, user gender, and user social media platform login data—where the determining (304) the usage prediction value may further depend on the user profile or on data obtained from analyzing the user profile.

Accessing (802) the user profile (852) may be carried out by the predictive allocation module (136) reading or requesting user profile data stored within a configuration file or within some other stored data structure. For example, a user, when creating an account, may provide biographical information such as an age, gender, and other preferences, which may be stored in a user profile for the user.

The predictive allocation module (136) may use the preferences to adjust a usage prediction value for a file identified within data to be written. For example, the predictive allocation module (136) may identify a content file within the data to be a particular song, and also determine that the song is within the genre of music specified within the user profile as a preferred type of musical genre. In this way, the predictive allocation module (136) may adjust upward the usage prediction value based on the expectation that the user may access a stored song more frequently if the song is within a preferred genre. Similarly, the predictive allocation module (136) may adjust other identified content files based on user preferences indicated within a user profile.

The prediction allocation module (136) may also use social media platform login data within a user profile to access social media data from a social media platform used by the user, and use the social media data to adjust a usage prediction value upward or downward. For example, the prediction allocation module (136) may access a social media account using the social media platform login data to obtain information on preferences for different types of media content. For example, if the social media platform is Facebook™, Twitter™, or some other social media platform, and if the user has "Liked" a page for, or indicated a preference for, a particular band, or movie, or some other content, then the predictive allocation module (136) may use this indication of a preference to adjust upward a usage prediction value for a file that includes content related to a "Liked" page, or includes content that is created by a person or group associated with a "Liked" page. Similarly, the predictive allocation module (136) may use preference data for friends of the user, or for contacts associated with the social media account for the user.

Figure 9:
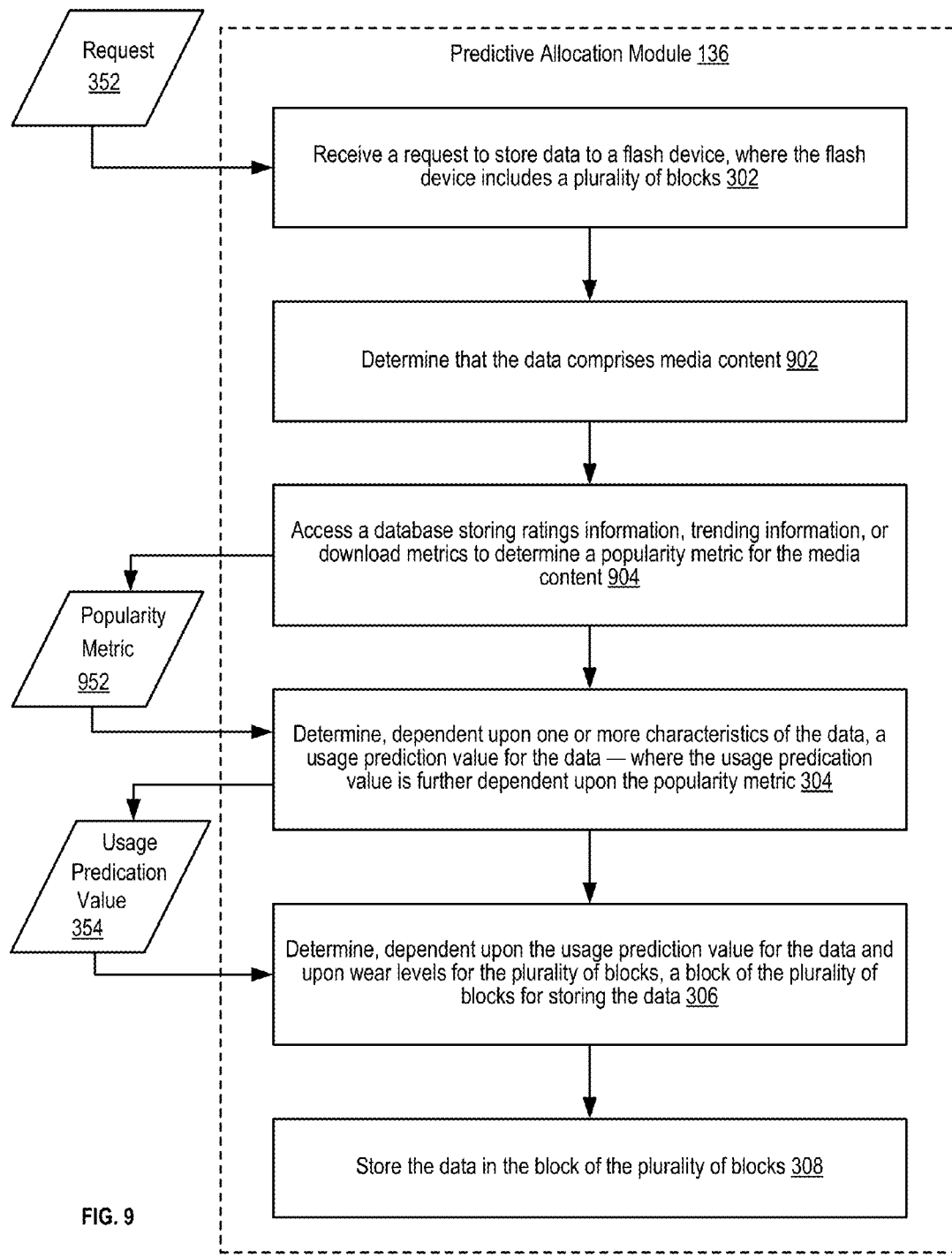
FIG. 9 depicts a flow chart illustrating another embodiment of a method for predictive block allocation in a flash device.

Turning to FIG. 9, the method of FIG. 9 is similar to the method of FIG. 3 in that the method of FIG. 9 includes: receiving (302) a request (352) to store data to a storage device, for example, a flash device, where the flash device includes a plurality of blocks; determining (304), in dependence upon one or more characteristics of the data, a usage prediction value for the data; determining (306), in dependence upon the usage prediction value (354) and in dependence upon wear levels for the plurality of blocks, a block of the plurality of blocks for storing the data; and storing the data in the block of the plurality of blocks.

However, the method of FIG. 9 differs from the method of FIG. 3 in that the method of FIG. 9 includes: determining (902) that the data comprises media content, and accessing (904) a database storing ratings information, trending information, or download metrics to determine a popularity metric (952) for the media content—where the determining (304) the usage prediction value may further depend on the popularity metric (952).

Determining (902) that the data comprises the media content may be carried out by the predictive allocation module (136) analyzing the data to identify a file or files, and analyzing metadata for the file or files to determine a file type or file types. In this example, the file may be a media content file, such as a video file.

Accessing (904) the database storing ratings information, trending information, or download metrics to determine a popularity metric may be carried out by the predictive allocation module (136) querying a third party service to request information related to the identified video file in the data to be stored.

For example, the predictive allocation module (136) may query a website, such as Rotten Tomatoes™, MetaCritic™, IMDB.com™, Billboard™ music charts, that provides information, such as ratings information and trending information, on movies if the media content is a movie or query a website that provides information on music if the media content is a music file. Further, a third party website or service may provide information on a number of times a media file has been downloaded or purchased. In this way, depending on ratings information, trending information, or download metrics, the predictive allocation module (136) may define a popularity metric for increasing or decreasing the usage prediction value for the data that includes the media content.

In an embodiment, the popularity metric may be a sum, or weighted sum, of the ratings information, trending information, and download metrics—where each individual metric may be scaled to a similar quantity. For example, ratings information may be on different scales, depending on which website or service provides the ratings information, and the ratings information may be scaled to a 100 point spectrum.

Similarly, download metrics may be scaled to a 100 point spectrum, where the top downloaded song of movie may set the top of the scale.

In an embodiment, threshold values for what may be considered to be popular or not popular may be specified in a configuration file, for example, the predictive allocation module (136) may increase the usage prediction value if media content is within a top ten list, make no adjustment if the media content is within the top twenty to fifty, and decrease the usage prediction value if the media content is outside a top one hundred. Similarly, different thresholds may be specified for adjusting a usage prediction value depending on the calculated popularity metric, where threshold values for popularity metrics may be specified in a configuration file.

The disclosed embodiments are described largely in the context of a fully functional computer system for predictive block allocation in a flash device. Readers of skill in the art will recognize, however, that the disclosed embodiments may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the disclosed methods as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

The disclosed embodiments for predictive block allocation in a flash device may be a system, a method, and/or a computer program product. The computer program product may include a computer readable storage medium (or media) having computer readable program instructions thereon for causing a processor to carry out features and aspects of the disclosed embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosed embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In an embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform features and aspects of the disclosed embodiments.

The disclosed embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments without departing from its true spirit. The descriptions in this specification are for purposes of illustration only and are not to be construed in a limiting sense. The scope of the present disclosure is limited only by the language of the following claims.

What is claimed is:

1. A method comprising:
    by program instructions on a computing device,
    receiving a request to store data to a flash device, the flash device comprising a plurality of blocks;
    determining, in dependence upon one or more characteristics of the data, a usage prediction value for the data;
    determining, in dependence upon the usage prediction value for the data and upon wear levels for the plurality of blocks, a block from among the plurality of blocks; and
    storing the data in the block of the plurality of blocks.

2. The method of claim 1, wherein determining the block from among the plurality of blocks further comprises:
    if the usage predication value is high usage, then determining the block in dependence upon a wear level for the block being low;
    if the usage predication value is medium usage, then determining the block in dependence upon the wear level for the block being medium; and
    if the usage prediction value is low usage, then determining the block in dependence upon the wear level for the block being high.

3. The method of claim 1, further comprising:
    determining an estimated remaining wear for each of the plurality of blocks of the flash device;
    wherein determining the block of the plurality of blocks further comprises:
        determining the block based on a wear level for the block being near, but not exceeding, the estimated remaining wear for the block if the block is written a number of times corresponding to the usage predication value.

4. The method of claim 1, further comprising:
    determining one of the one or more characteristics of the data to be a file type; and
    determining usage patterns for previously stored files of the file type;
    wherein determining the usage prediction value is in dependence upon the usage patterns.

5. The method of claim 1, further comprising:
    determining a relationship between a file in the data and a previously stored file, wherein the relationship includes one or more of: being a sequel, being a similar type of content, or being referenced;
    wherein determining the usage prediction value is in dependence upon the relationship.

6. The method of claim 1, further comprising:
    accessing a user profile describing usage characteristics for files or applications relative to content of the files or applications;
    wherein determining the usage prediction value is in dependence upon the user profile.

7. The method of claim 1, further comprising:
    determining that the data comprises media content; and
    accessing a database storing ratings information, trending information, or download metrics to determine a popularity metric for the media content;
    wherein determining the usage prediction value is in dependence upon the popularity metric for the media content.

8. An apparatus comprising a computer processor and a non-transitory computer memory operatively coupled to the computer processor, the non-transitory computer memory having disposed within it computer program instructions that, when executed by the computer processor, cause the apparatus to carry out:
    receiving a request to store data to a flash device, the flash device comprising a plurality of blocks;
    determining, in dependence upon one or more characteristics of the data, a usage prediction value for the data;
    determining, in dependence upon the usage prediction value for the data and upon wear levels for the plurality of blocks, a block from among the plurality of blocks; and
    storing the data in the block of the plurality of blocks.

9. The apparatus of claim 8, wherein determining the block from among the plurality of blocks further comprises:
    if the usage predication value is high usage, then determining the block in dependence upon a wear level for the block being low;
    if the usage predication value is medium usage, then determining the block in dependence upon the wear level for the block being medium; and
    if the usage prediction value is low usage, then determining the block in dependence upon the wear level for the block being high.

10. The apparatus of claim 9, further comprising computer program instructions that, when executed by the computer processor, cause the apparatus to carry out:
    determining an estimated remaining wear for each of the plurality of blocks of the flash device;
    wherein determining the block of the plurality of blocks further comprises:
        determining the block based on a wear level for the block being near, but not exceeding, the estimated remaining wear for the block if the block is written a number of times corresponding to the usage predication value.

11. The apparatus of claim 10, further comprising computer program instructions that, when executed by the computer processor, cause the apparatus to carry out:
   determining one of the one or more characteristics of the data to be a file type; and
   determining usage patterns for previously stored files of the file type;
   wherein determining the usage prediction value is in dependence upon the usage patterns.

12. The apparatus of claim 9, further comprising computer program instructions that, when executed by the computer processor, cause the apparatus to carry out:
   determining a relationship between a file in the data and a previously stored file, wherein the relationship includes one or more of: being a sequel, being a similar type of content, or being referenced;
   wherein determining the usage prediction value is in dependence upon the relationship.

13. The apparatus of claim 9, further comprising computer program instructions that, when executed by the computer processor, cause the apparatus to carry out: accessing a user profile describing usage characteristics for files or applications relative to content of the files or applications;
   wherein determining the usage prediction value is in dependence upon the user profile.

14. The apparatus of claim 13, further comprising computer program instructions that, when executed by the computer processor, cause the apparatus to carry out:
   determining that the data comprises media content; and
   accessing a database storing ratings information, trending information, or download metrics to determine a popularity metric for the media content;
   wherein determining the usage prediction value is in dependence upon the popularity metric for the media content.

15. A computer program product comprising a non-transitory, computer-readable medium, wherein the computer-readable medium comprises computer program instructions that, when executed, cause a computer to carry out the steps of:
   receiving a request to store data to the flash device;
   determining, in dependence upon one or more characteristics of the data, a usage prediction value for the data;
   determining, in dependence upon the usage prediction value for the data and upon wear levels for the plurality of blocks, a block from among the plurality of blocks; and
   storing the data in the block of the plurality of blocks.

16. The computer program product of claim 15, wherein determining the block from among the plurality of blocks further comprises:
   if the usage predication value is high usage, then determining the block in dependence upon a wear level for the block being low;
   if the usage predication value is medium usage, then determining the block in dependence upon the wear level for the block being medium; and
   if the usage prediction value is low usage, then determining the block in dependence upon the wear level for the block being high.

17. The computer program product of claim 15, wherein the steps further comprise:
   determining an estimated remaining wear for each of the plurality of blocks of the flash device;
   wherein determining the block of the plurality of blocks further comprises:
   determining the block based on a wear level for the block being near, but not exceeding, the estimated remaining wear for the block if the block is written a number of times corresponding to the usage predication value.

18. The computer program product of claim 15, wherein the steps further comprise:
   determining one of the one or more characteristics of the data to be a file type; and
   determining usage patterns for previously stored files of the file type;
   wherein determining the usage prediction value is in dependence upon the usage patterns.

19. The computer program product of claim 15, wherein the steps further comprise:
   determining a relationship between a file in the data and a previously stored file, wherein the relationship includes one or more of: being a sequel, being a similar type of content, or being referenced;
   wherein determining the usage prediction value is in dependence upon the relationship.

20. The computer program product of claim 15, wherein the steps further comprise: accessing a user profile describing usage characteristics for files or applications relative to content of the files or applications;
   wherein determining the usage prediction value is in dependence upon the user profile.

* * * * *